UNITED STATES PATENT OFFICE.

JOHN H. STEVENS, OF NEW YORK, N. Y.

IMPROVEMENT IN THE MANUFACTURE OF FRICTION MATCHES FOR PRESERVING THEM FROM ACCIDENTAL IGNITION.

Specification forming part of Letters Patent No. 1,412, dated November 16, 1839.

*To all whom it may concern:*

Be it known that I, JOHN HUCKS STEVENS, of the city, county, and State of New York, have discovered a new and useful Improvement in the Manufacture of Matches and of other Instantaneous Lights, of which the following is a specification.

The nature of which consists in the covering or coating over such part or parts as shall have been dipped into or shall have had otherwise applied composition of matter or matters used for the production of instantaneous lights with an exterior coating of varnish or glutinous substance, or of any covering or capsule of matter or composition of matter which shall have the effect or tendency to exclude dampness, atmospheric air, water, or other fluid or combination of fluids from coming in contact with said composition of matter or matters used in the production of instantaneous lights. The said covering or coating over renders the match or other instantaneous light less liable to ignition from accidental friction. It also renders less offensive the smell, exhalation, or exesion which usually acccompanies phosphorus or compounds of matter used for the like purposes of ignition; and it also tends to the prevention of the match or light being affected by age, or by dampness or moisture, and hence materially adds to the durability of matches or other lights in manner so prepared and coated over. What I use in general is a solution of gum-mastic made with spirits of turpentine, or of an alcoholic solution of gum-copal or of gum-mastic; but other glutinous gums, resins, tenacious matter, or compounds may be used, as also turpentine, alcoholic or other solution of gums, resins, glutinous substances, or other matter or compound producing the like results.

What I claim as my improvement in the manufacture of friction-matches, &c., is—

The mode of manufacturing them so as to preserve them from accidental ignition by means of a coating of varnish, as herein set forth.

JOHN HUCKS STEVENS.

Witnesses:
W. JAY HASKETT,
JOHN M. COOPER.